United States Patent
Huang et al.

(10) Patent No.: US 8,644,195 B2
(45) Date of Patent: Feb. 4, 2014

(54) RING-BASED NETWORK AND CONSTRUCTION THEREOF

(75) Inventors: Nen-Fu Huang, Hsinchu (TW); Chih-Hao Chen, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 219 days.

(21) Appl. No.: 13/331,437

(22) Filed: Dec. 20, 2011

(65) Prior Publication Data

US 2013/0039222 A1    Feb. 14, 2013

(30) Foreign Application Priority Data

Aug. 9, 2011    (TW) .............................. 100128443 A

(51) Int. Cl.
*H04L 12/28*    (2006.01)
(52) U.S. Cl.
USPC ............................ 370/258; 370/223; 370/224
(58) Field of Classification Search
None
See application file for complete search history.

(56) References Cited

U.S. PATENT DOCUMENTS

| | | | | |
|---|---|---|---|---|
| 4,680,757 A | * | 7/1987 | Murakami et al. | 370/455 |
| 6,766,482 B1 | * | 7/2004 | Yip et al. | 714/717 |
| 7,382,726 B2 | * | 6/2008 | Lee et al. | 370/231 |
| 7,664,052 B2 | * | 2/2010 | Oku et al. | 370/254 |
| 2010/0329261 A1 | * | 12/2010 | Sakamoto et al. | 370/392 |
| 2011/0019538 A1 | * | 1/2011 | Ryoo et al. | 370/225 |

* cited by examiner

*Primary Examiner* — Ian N Moore
*Assistant Examiner* — Latresa McCallum
(74) *Attorney, Agent, or Firm* — Wang Law Firm, Inc.; Li K. Wang; Stephen Hsu

(57) ABSTRACT

A ring-based network and a construction method thereof, comprising a plurality of nodes and a plurality of links. In an initial status, each node compares each first link-up packet and fills a priority value in the first link-up packet with the higher priority value to form a second link-up packet. The priority value of each node and the highest priority value of each adjacent node recorded in each node are compared with each second link-up packet. When the priority value of the node and the highest priority values of adjacent nodes recorded in the node are smaller than the second link-up packet, the ring port of the node is situated at a forward status. According to the forward status or a blocked status of the ring port, these links form a plurality of forward links and a blocked link respectively.

17 Claims, 5 Drawing Sheets

RING-BASED NETWORK AND CONSTRUCTION THEREOF

CROSS-REFERENCE TO RELATED APPLICATION

This application claims the benefit of priority to Taiwan Patent Application No. 100128443, filed on Aug. 9, 2011, in the Taiwan Intellectual Property Office, the disclosure of which is incorporated herein in its entirety by reference.

BACKGROUND OF THE INVENTION

1. Field of the Invention

The present invention relates to a ring-based network and a construction method of the ring-based network, in particular to the ring-based network using a link as the connection basis to form a distributed ring topology structure.

2. Description of the Related Art

Computer network is generally defined as a complete data sharing environment formed by connecting computers and communication devices. The form of connecting networks includes Line, Ring, Bus, Star, Mesh or Tree topologies, wherein each node in a ring-based network is connected serially to form a closed ring structure. The circuit of the ring-based network is a closed circular loop formed by serially connecting each node in the network. In local area network or industrial network applications, each node has a network switch, and each switch is connected to a communication device such as a computer, a server or a terminal for providing the information exchange function. However, it is necessary to set a master switch and at least one slave switch in a conventional ring-based network, and nodes are usually used as a basis for the connection of the master switches with the slave switches to form the ring-based network structure. The way of connecting each slave switch requires a complicated and time-consuming priority setting procedure to determine the priority of connecting each slave switch. Therefore, the conventional ring-based network construction method requires a complicated priority setting procedure for constructing the network, and the network construction takes much time. Furthermore, the complicated setting procedure causes errors occurred in the construction process easily.

In addition, the ring-based network architecture is generally used in an industrial network. For the industrial network with a requirement of using a large quantity of switches, the priority setting process of the master switch involves a high level of difficulty. If the quantity of the switches is increased flexibly in the ring-based network, each switch must be reset and the priority value setting procedure must be performed again and thus resulting in a waste of manpower, time and cost.

SUMMARY OF THE INVENTION

In view of the problems of the conventional ring-based network, it is a primary objective of the present invention to provide a ring-based network and a construction method thereof to overcome the complexity of the priority setting procedure of the master node and the slave node to reduce the construction time and the repair time of the ring-based network.

Another objective of the present invention is to provide a ring-based network comprising a plurality of nodes and a plurality of links. Each node has two ring ports and an unrepeated priority value. At an initial status, each ring port is in a blocked status, and each node outputs a first link-up packet. Each first link-up packet includes a priority value of each node. Each link is coupled to each ring port.

At the initial status, each node compares each first link-up packet, and fills the priority value of each node into the first link-up packet having a higher priority value to form a second link-up packet. The priority value of each node and the highest priority value of each adjacent node recorded by each node are compared with each second link-up packet. If the priority value of the node and the highest priority value of each adjacent node recorded by the node are smaller than the second link-up packet, the ring port enters into a forward status. According to the forward status or blocked status of each ring port, the links form a plurality of forward links and a blocked link respectively.

Wherein, each node enters each ring port into the blocked status according to a ring port link-up message.

Wherein, each node further loads the priority value contained in the first link-up packet transmitted from each adjacent node into each corresponding ring port of the adjacent node.

Wherein, the ring port remains at the blocked status if the priority value of the node and the highest priority value of each adjacent node recorded by the node are equal to or greater than the second link-up packet, and each node discards the second link-up packet having a lower priority value and no longer transmits this packet to the adjacent node.

Wherein, the blocked link is a backup link of the ring-based network.

In addition, the present invention further provides a construction method of a ring-based network, and the ring-based network comprises a plurality of nodes and a plurality of links, and each node has two ring ports and a priority value, and each link is coupled to each ring port. The construction method comprises the steps of entering each ring port into a blocked status at an initial status; outputting a first link-up packet by each node through each ring port, wherein each first link-up packet includes a priority value of each node; comparing each first link-up packet, and filling the priority value of each node into the first link-up packet having a higher priority value to form a second link-up packet; comparing the priority value of each node and the highest priority value of each adjacent node recorded by each node with each second link-up packet; entering the ring port into a forward status if the priority value of the node and the highest priority value of each adjacent node recorded by the node are smaller than the second link-up packet; and forming a plurality of forward links and a blocked link by each link according to the forward status or the blocked status of each ring port.

The construction method further comprises the step of entering each ring port into the blocked status if each node detects and obtains a ring port link-up message.

The construction method further comprises the step of loading the priority value in each first link-up packet into each ring port of an adjacent node, if each node receives the first link-up packet transmitted from each adjacent node.

The construction method further comprises the steps of maintaining the ring port at a blocked status if the priority value of the node and the highest priority value of each adjacent node recorded by the node are equal to or greater than second link-up packet; and discarding the second link-up packet having a lower priority value by the node and no longer transmitting the second link-up packet having a lower priority value to an adjacent node.

The construction method further comprises the step of using the blocked link to form a backup link of the ring-based network.

In summation, the ring-based network and a construction method thereof in accordance with the present invention have one or more of the following advantages:

(1) The construction method uses each node to compare the second link-up packet to automatically form a forward status or a blocked status of each ring port to simplify the priority value setting process for the master node, sub-master node and sub-sub master node and reduce the waste of time.

(2) The construction method uses each node to compare the second link-up packet to form a plurality of forward links and a blocked link to achieve the effects of constructing the ring-based network automatically, simplifying the link setting procedure and improving the speed and efficiency of constructing the ring-based network.

(3) The construction method compares the priority value of each node to achieve the effect of constructing the ring-based network automatically and facilitate increasing the quantity of switches in the industrial network.

DESCRIPTION OF THE PREFERRED EMBODIMENTS

The technical characteristics and effects of the present invention will become apparent by the detailed description of preferred embodiments and related drawings as follows. For simplicity, same numerals are used to represent respective elements in the preferred embodiment and drawings.

Figure 1:
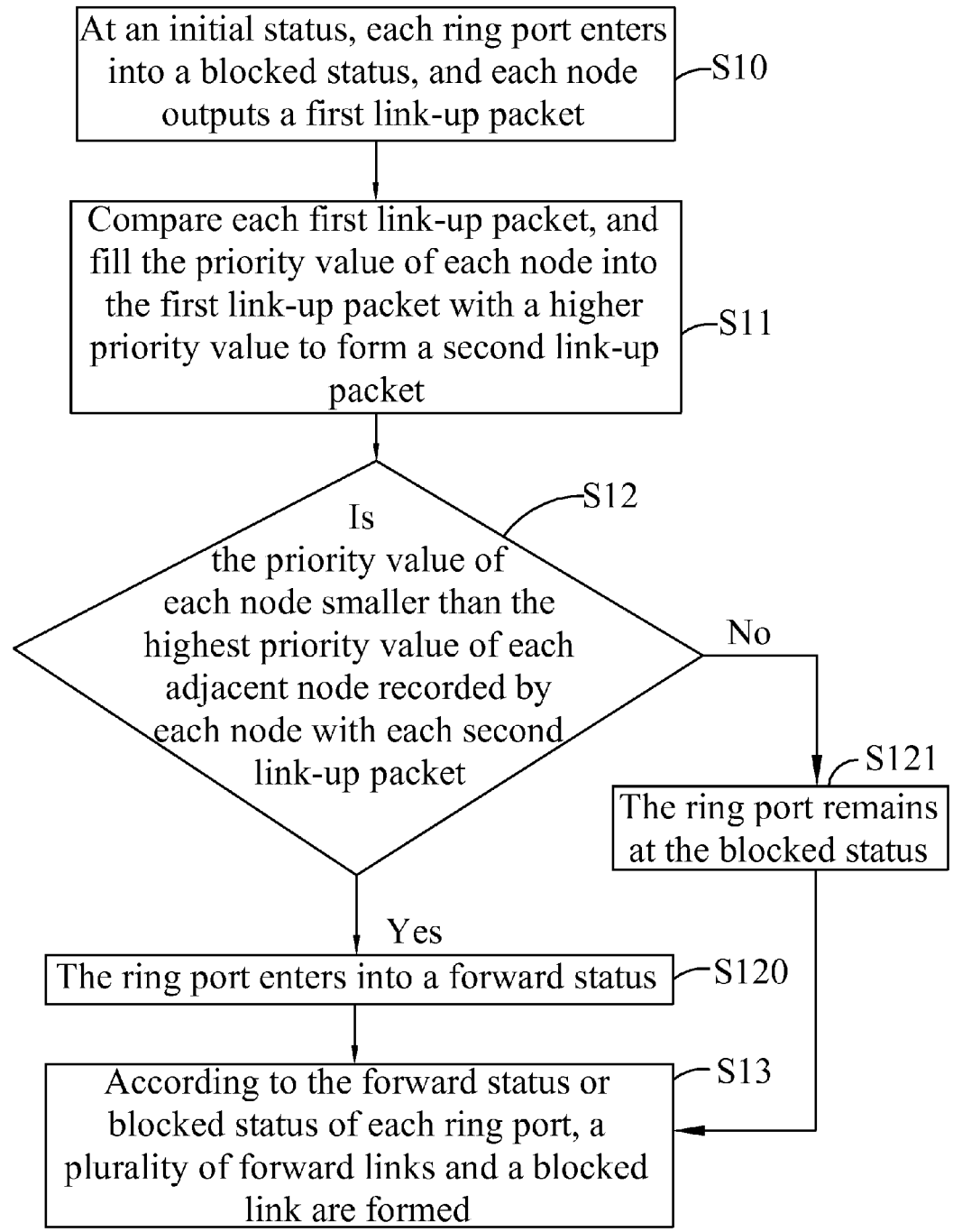
FIG. 1 is a flow chart of a construction method of a ring-based network of the present invention.

With reference to FIG. 1 for a flow chart of a construction method of a ring-based network in accordance with the present invention, the ring-based network comprises a plurality of nodes and a plurality of links, and each node includes a priority value and at least two ring ports. Each link of the ring-based network is coupled to each ring port. In the same ring-based network, the priority value of each node is not repeated. The construction method comprises the following steps.

In Step S10, each node can detect and obtain a ring port link-up message when the ring-based network is at an initial status, so that each ring port of each node enters into a blocked status, and each node can output a first link-up packet to an adjacent node through each ring port. The first link-up packet (up,i,0) includes the priority value "i" of each node.

In Step S11, if each node i receives the first link-up packets (up,j,0) and (up,k,0) transmitted from each adjacent node j, k, each node i can load the priority value "j" and "k" of each first link-up packet in the adjacent node into each corresponding ring port of the adjacent node, so that each node can record the priority values of the nodes of two adjacent ring ports. Each node compares the priority values of the adjacent nodes of the two received first link-up packets. If the adjacent node j has a higher priority value than the other adjacent node k, then each node i will discard the first link-up packet (up,k,0) having a lower priority value and no longer transmit it to the other adjacent node j. The priority value "i" is filled into the first link-up packet (up,j,0) with a higher priority value in the two first link-up packets. After the priority value "i" of each node is arranged sequentially after the priority value "j" of the adjacent node, a second link-up packet (up,j,i) is formed to be transmitted to another node k.

In Step S12, the priority value of each node and the highest priority value of each adjacent node recorded by each node are used to compare with each second link-up packet. If the priority value of the node and the highest priority value of each adjacent node recorded by the node are smaller than the priority value of the second link-up packet, the procedure goes to Step S120, wherein the ring port enters into a forward status. If the priority value of the node and the highest priority value of each adjacent node recorded by the node are equal to or greater than the priority value of the second link-up packet, the procedure goes to Step S121, wherein each node discards the second link-up packet with a lower priority value and no longer transmits this packet to the other adjacent node, and the ring port remains at a blocked status.

In Step S13, if the second link-up packet having the highest priority value is returned to each original output node, each original output node will no longer transmit the second link-up packet having the highest priority value to the ring-based network. According to the forward status or blocked status of each ring port of each node, a plurality of forward links and a blocked link are formed, wherein the blocked link is used as a backup link, so that the ring-based network becomes a closed ring-based network having a backup link.

Figure 2:
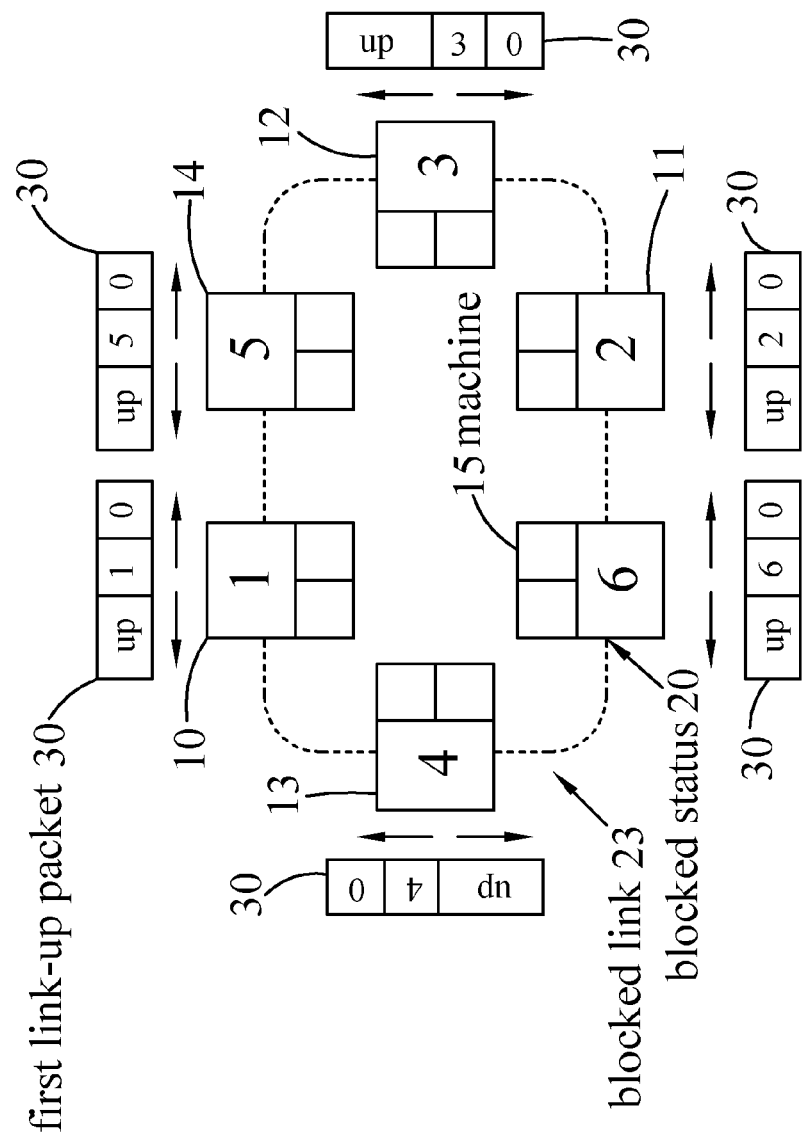
FIG. 2 is a schematic view of a first status of a construction method of a ring-based network in accordance with the present invention.
Figure 3:
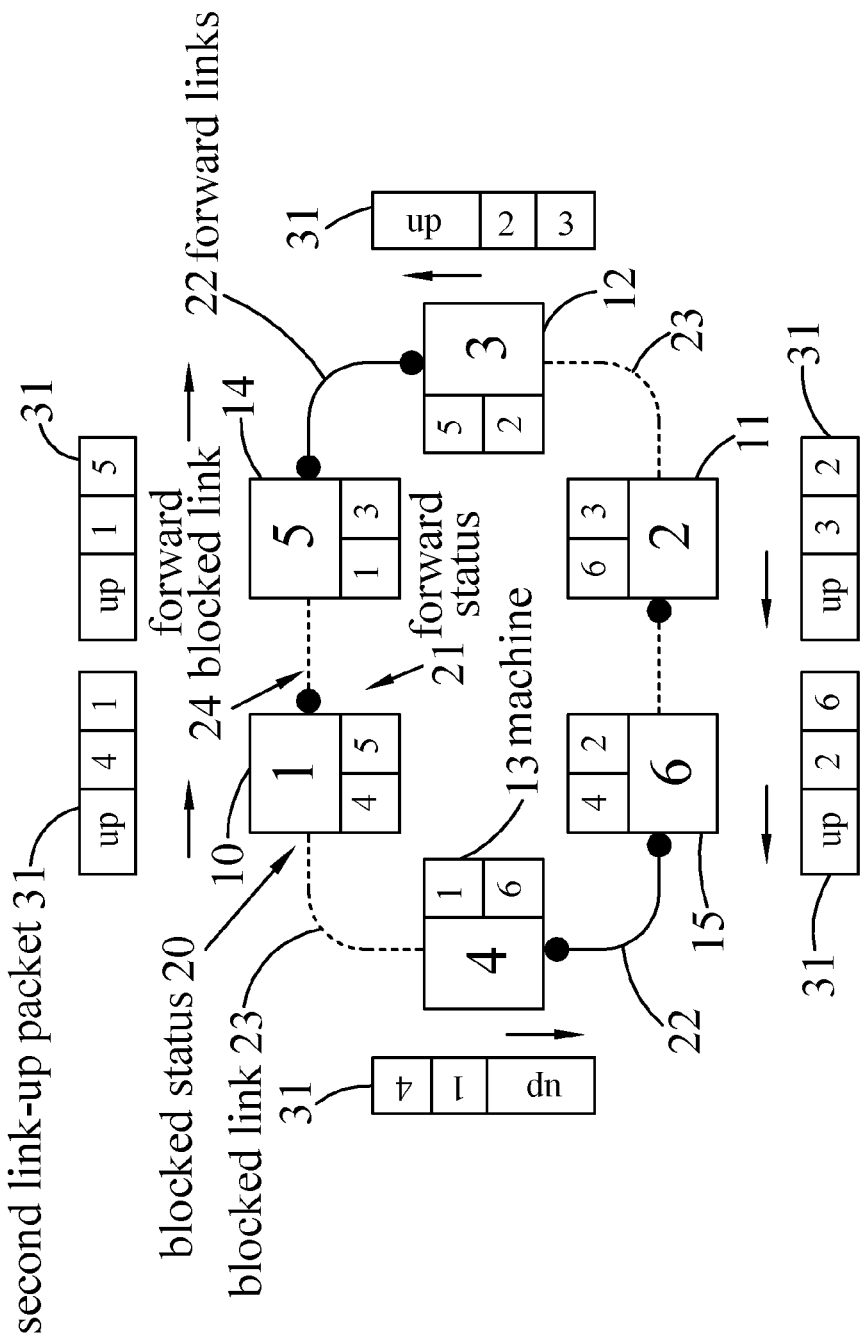
FIG. 3 is a schematic view of a second status of a construction method of a ring-based network in accordance with the present invention.

With reference to FIGS. 2 and 3 for the schematic views of a first status and a second status of a construction method of a ring-based network in accordance with the present invention respectively, the ring-based network comprises a plurality of nodes, and each node includes a switch disposed thereon and coupled to a communication device such as a computer or a server. By linking the ring ports of the switches, each communication device exchanges information through the ring-based network. In addition, a media access control address (MAC address) or an unrepeated identity (ID) can be used for setting the priority value of each node, but the invention is not limited to such arrangement only. At the initial status of constructing the ring-based network, each ring port of each switch is switched to a blocked status 20, so that the ring port allows control packets and prohibits normal packets to pass through. In the meantime, each switch can transmit a first link-up packet 30 (up,i,0) including a priority value to determine the priority of transmitting the packet transmitted or received by each switch. In addition, each switch can load the priority values "j" and "k" of the first link-up packets 30 (up,j,0) and (up,k,0) transmitted from each adjacent switch j and k into a corresponding port respectively and compares the priority values "j" and "k" in each first link-up packet 30. If the priority value "j" of the adjacent switch j is higher than "k", then the priority value "i" of each switch is filled into the first link-up packet 30 (up,j,0) having a higher priority value to form a second link-up packet 31 (up,j,i) to be transmitted to another adjacent switch k. Then, the priority value "i" of each switch and the highest priority value "j" of each adjacent switch recorded by each adjacent switch are compared with the second link-up packet 31 (up,m,n) which is received subsequently to determine the communication status of the link between each switch and its adjacent switch.

In other words, each switch i can compute the priority values of each switch i and each adjacent switch j, k in advance. If the priority value "j" is higher than "k", then pri (i,j)>pri (i,k), and each switch i can use its priority value "i" and the highest priority value "j" of each adjacent switch to compare the priority values "m" and "n" of the second link-up packet 31.

If the priority value of each switch and the highest priority value of each adjacent switch recorded by each switch are smaller than or equal to the priority value of the second link-up packet 31, and pri (i,j)<pri (m,n), then the ring port of the switch i can enter into a forward status 21. In the figures, the forward status 21 of each ring port is represented by a black dot in this preferred embodiment, and the ring port allows both control packets and normal packets to pass through.

If the priority value of each switch and the highest priority value of each adjacent switch recorded by each switch are equal to or greater than the priority value of the second link-up packet 31 or pri (i,j)≥pri (i,k) and pri (i,j)≤pri (m,n), then the ring port will remain at the blocked status 20 and discard the second link-up packet 31 (up,m,n). Therefore, a plurality of forward links 22 and only one blocked link 23 are formed to constitute a link having the highest priority value and complete the construction of a closed ring-based network with a backup link.

For example, six switches are disposed in the ring-based network and designated as No. 1 machine 10, No. 2 machine 11, No. 3 machine 12, No. 4 machine 13, No. 5 machine 14 and No. 6 machine 15 according to the priority value of each switch. The smaller the number, the higher is the priority. In other words, the No. 1 machine 10 has a priority value "1" higher than a priority value "2" of the No. 2 machine 11, and the priority value "2" of the No. 2 machine 11 is higher than a priority value "3" of the No. 3 machine 12, and the priority value "3" of the No. 3 machine 12 is higher than a priority value "4" of the No. 4 machine 13, and so forth.

In this preferred embodiment, a ring port of the No. 1 machine 10 is linked to a ring port of the No. 5 machine 14, and another ring port of the No. 1 machine 10 is linked to a ring port of the No. 4 machine 13. A ring port of the No. 3 machine 12 is linked to another ring port of the No. 5 machine 14, and another ring port of the No. 3 machine 12 is linked to a ring port of the No. 2 machine 11. A ring port of the No. 6 machine 15 is linked to another ring port of the No. 2 machine 11, and another ring port of the No. 6 machine 15 is linked to another ring port of the No. 4 machine 13. At the initial status when the ring-based network is constructed, the six switches are turned on simultaneously, so that the six switches can detect and obtain a ring port link-up message. Therefore, each ring port of each switch can enter into the blocked status 20 to allow control packets and prohibit normal packets to pass through. The No. 1 machine 10 outputs the first link-up packet 30 (up,1,0) to the No. 4 machine 13 and the No. 5 machine 14 through two ring ports; the No. 2 machine 11 outputs the first link-up packet 30 (up,2,0) to the No. 3 machine 12 and the No. 6 machine 15 through two ring ports; the No. 3 machine 12 outputs the first link-up packet 30 (up,3,0) to the No. 2 machine 11 and the No. 5 machine 14 through two ring ports; the No. 4 machine 13 outputs the first link-up packet 30 (up,4,0) to the No. 1 machine 10 and the No. 6 machine 15 through two ring ports, and so forth. Each switch can output the first link-up packet 30 to its adjacent switch through each ring port. The No. 1 machine 10 loads the priority value "4" of the packet (up,4,0) transmitted from the No. 4 machine 13 into a corresponding ring port of the No. 4 machine 13; the priority value "5" of the packet (up,5,0) transmitted from the No. 5 machine 14 is loaded into the ring port of the No. 5 machine 15. The No. 5 machine 14 loads the priority value "1" of the No. 1 machine 10 into a corresponding ring port of the No. 1 machine 10 and loads the priority value "3" of the No. 3 machine 12 into a corresponding ring port of the No. 3 machine 12. The No. 3 machine 12 loads the priority value "5" of the No. 5 machine 14 into a corresponding ring port of the No. 5 machine 14 and loads the priority value "2" of the No. 2 machine 11 into a corresponding ring port of the No. 2 machine 11, and so forth. In other words, each switch loads the priority value of an adjacent switch into a corresponding ring port.

In addition, the No. 1 machine 10 can compare the received packets (up,4,0) and (up,5,0). Since the priority value "4" is higher than the priority value "5", therefore the No. 1 machine 10 corresponding to the ring port of the No. 5 machine 14 will be switched to a forward status 21 to allow both control packets and normal packets to pass through, and will discard the packet (up,5,0) and no longer transmit this packet. In the meantime, the No. 1 machine 10 corresponding to the ring port of the No. 4 machine 13 will remain at the blocked status 20 and fill the priority value "1" into the packet (up,4,0) to form a second link-up packet 31 (up,4,1). The No. 1 machine 10 will transmit the second link-up packet 31 (up,4,1) to the No. 5 machine 14. The No. 5 machine 14 compares the received packets (up,1,0) and (up,3,0). Since the priority value "1" is higher than the priority value "3", therefore the No. 5 machine 14 corresponding to the ring port of the No. 3 machine 12 will be switched to a forward status 21 and will discard the packet (up,3,0) and no longer transmits this packet. In the meantime, the corresponding ring port of the No. 1 machine 10 will remain at the blocked status 20 and fill the priority value "5" into the packet (up,1,0) to form a second link-up packet 31 (up, 1,5). The No. 5 machine 14 transmits the second link-up packet 31 (up,1,5) to the No. 3 machine 12. the No. 3 machine 12 compares the received packets (up,2,0) and (up,5,0). Since the priority value "2" is higher than priority value "5", therefore the No. 3 machine 12 corresponding to the ring port of the No. 5 machine 14 will be switched to the forward status 21, and will discard the packet (up,5,0) and no longer transmit this packet. In the meantime the corresponding ring port of the No. 2 machine 11 will remain at the blocked status 20 and fill the priority value "3" into the packet (up,2,0) to form a second link-up packet 31 (up,2,3). The No. 3 machine 12 transmits the second link-up packet 31 (up,2,3) to the No. 5 machine 14.

Similarly, the No. 2 machine 11 compares the received packets (up,3,0) and (up,6,0). Since the priority value "3" is higher than the priority value "6", therefore the No. 2 machine 11 corresponding to the ring port of the No. 6 machine 15 will be switched to the forward status 21, and will discard the packet (up,6,0) and no longer transmit this packet. In the meantime, the ring port corresponding to the No. 3 machine 12 will remain at the blocked status 20 and fill the priority value "2" into the packet (up,3,0) to form a second link-up packet 31 (up,3,2). The No. 2 machine 11 transmits the second link-up packet 31 (up,3,2) to the No. 6 machine 15. The No. 6 machine 15 compares the received packets (up,2,0) and (up,4,0). Since the priority value "2" is higher than the priority value "4", therefore the No. 6 machine 15 corresponding to the port of the No. 4 machine 13 will be switched to the forward status 21, and will discard the packet (up,4,0) and no longer transmit this packet. In the meantime, the ring port corresponding to the No. 2 machine 11 will remain at the blocked status 20 and fill the priority value "6" into the packet (up,2,0) to form a second link-up packet 31 (up,2,6). The No. 6 machine 15 transmits the second link-up packet 31 (up,3,2) to the No. 4 machine 13. The No. 4 machine 13 compares the received packets (up,1,0) and (up,6,0). Since the priority value "1" is higher than the priority value "6", therefore the No. 4 machine 13 corresponding to the ring port of the No. 6 machine 15 will be switched to the forward status 21, and will discard the packet (up,6,0) and no longer transmit this packet. In the meantime, the corresponding ring port of the No. 1 machine 10 will remain at the blocked status 20 and fill the priority value "4" into the packet (up,1,0) to form a second link-up packet 31 (up,1,4). The No. 4 machine 13 transmits the second link-up packet 31 (up,1,4) to the No. 6 machine 15. Therefore, a forward-blocked link 24 is formed between the No. 1 machine 10 and the No. 5 machine 14 and between the No. 2 machine 11 and the No. 6 machine 15; the forward link 22 is formed between the No. 5 machine 14 and the No. 3 machine 12 and between the No. 4 machine 13 and the No. 6 machine 15; and the blocked link 23 is formed between the No. 3 machine 12 and the No. 2 machine 11 and between the No. 4 machine 13 and the No. 1 machine 10.

Figure 4:
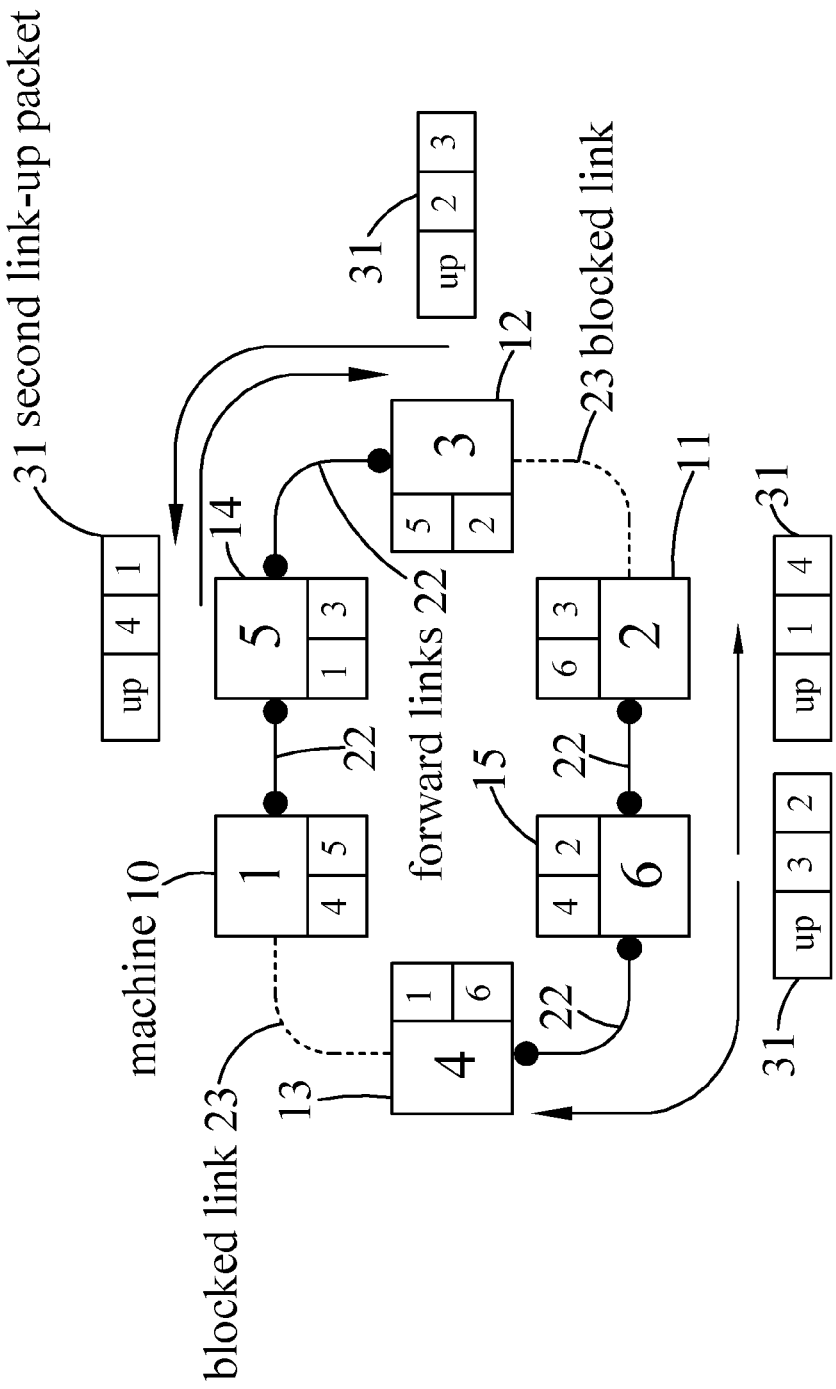
FIG. 4 is a schematic view of a third status of a construction method of a ring-based network in accordance with the present invention.
Figure 5:
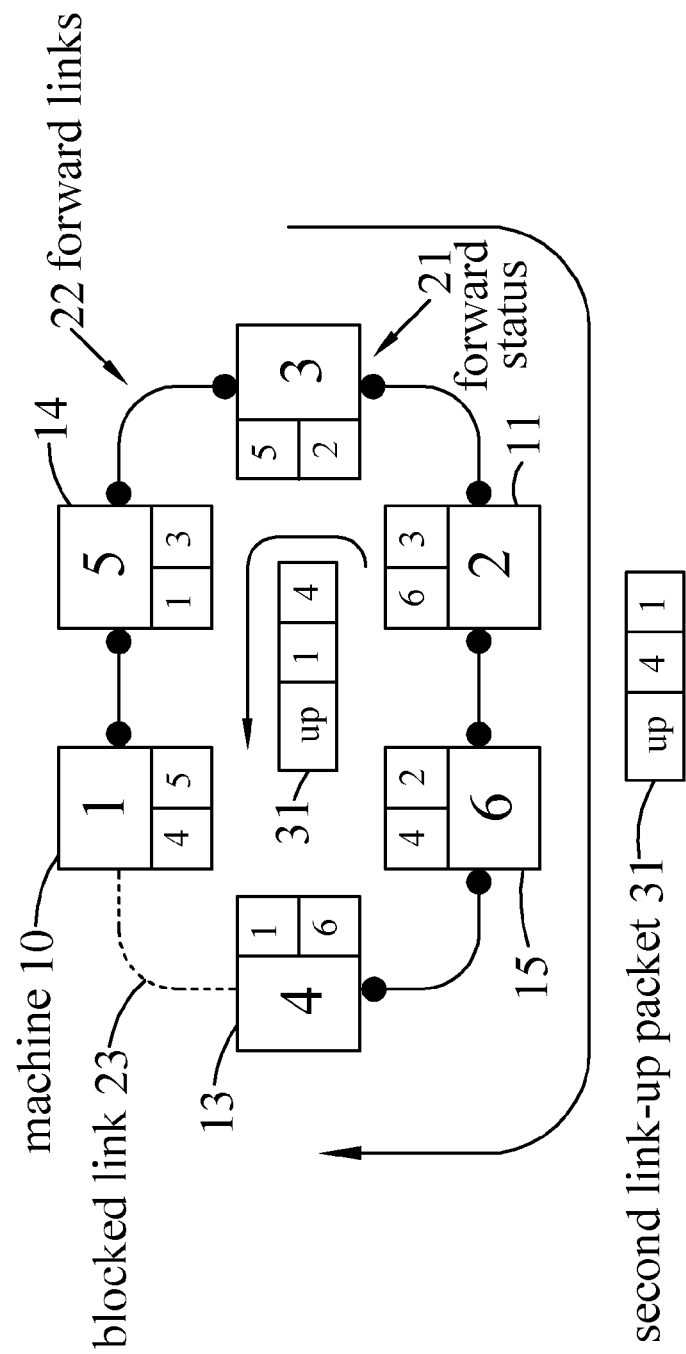
FIG. 5 is a schematic view of a fourth status of a construction method of a ring-based network in accordance with the present invention.

With reference to FIGS. 4 and 5 for the schematic views of a third status and a fourth status of a construction method of a ring-based network in accordance with the present invention respectively, the No. 5 machine 14 further receives and compares the second link-up packets 31 (up,4,1) and (up,2,3). Since the priority value "5" of the No. 5 machine 14 and the highest priority value pri (5,1) in the priority values "1" and "3" recorded by the adjacent switch are smaller than the priority value pri (4,1) of the second link-up packet 31 (up,4,1) or pri (5,1)>pri (5,3) and pri (5,1)<pri (4,1), therefore the ring port corresponding to the No. 1 machine 10 will be switched to the forward status 21, and the packet (up,4,1) will be transmitted to the No. 3 machine 12. Since pri (5,1)>pri (2,3), the (up,2,3) will be discarded and no longer transmitted to the No. 1 machine 10.

In the No. 3 machine 12, pri (3,2)>pri (3,5) and pri (3,2)<pri (1,5) and pri (4,1), so that the ring port corresponding to the No. 5 machine 14 will remain at the forward status 21, and the packets (up,1,5) and (up,4,1) will be transmitted to the No. 2 machine 11. In the No. 2 machine 11, pri (2,3)>pri (2,6) and pri (2,3)<pri (1,5) and pri (4,1), so that the ring port corresponding to the No. 3 machine 12 will be switched to the forward status 21, and the packets (up,1,5) and (up,4,1) will be transmitted to the No. 6 machine 15.

In the No. 6 machine 15, pri (6,2)>pri (6,4) and pri (6,2)<pri (3,2), pri (1,5), pri (4,1) and pri (1,4), so that the No. 6 machine 15 will transmit the packets (up,3,2), (up,1,5) and (up,4,1) to the No. 4 machine 13 and the packet (up,1,4) to the No. 2 machine 11. It is noteworthy to point out that the pri (1,4) of the second link-up packet 31 (up,1,4) is greater than the pri (2,3) of the No. 2 machine 11 and the pri (3,2) of the No. 3 machine 12, so that the No. 3 machine 12 corresponding to the ring port of the No. 2 machine 11 will be switched to the forward status 21 and will transmit the packet (up,1,4) to the No. 5 machine 14.

In the No. 4 machine 13, pri (4,1)>pri (4,6) and pri (4,1)>pri (3,2) and pri (1,5), so that the No. 4 machine 13 will discard the packets (up,3,2) and (up,1,5). The pri (4,1) of the No. 4 machine 13 and the pri (4,1) of the second link-up packet 31 have the same priority value, and the No. 4 machine 13 will discard and no longer transmit this packet (up,4,1). On the other hand, if the No. 1 machine 10 also receives a second link-up packet 31 (up,1,4) with the same priority value pri (1,4), the No. 1 machine 10 will also discard this packet.

Therefore, the forward-blocked link 24 formed between the No. 1 machine 10 and the No. 5 machine 14 is converted into the forward link 22. The blocked-forward link 25 formed between the No. 2 machine 11 and the No. 6 machine 15 is converted into the forward link 22. The blocked link 23 between the No. 2 machine 11 and the No. 3 machine 12 is converted into the forward link 22. The blocked link 23 formed between the No. 1 machine 10 and the No. 4 machine 13 remains unchanged, and this locked link 23 serves as a backup link of the ring-based network in this preferred embodiment, so as to complete the construction procedure.

It is noteworthy to point out that the ring-based network and a construction method thereof in accordance with the present invention adopts the embodiment of using a smaller priority value to represent a higher weight of the priority for the purpose of illustrating the invention only, but not intended for limiting the scope of the invention.

In summation of the description above, the construction method of a ring-based network uses each switch to compare the second link-up packet to form a forward link and a blocked link, so as to achieve the effects of constructing the ring-based network, simplifying the link setting procedure, and reducing the waste of manpower.

What is claimed is:

1. A ring-based network, comprising:
a plurality of nodes each having two ring ports and an unrepeated priority value, and each ring port being in a blocked status at an initial status, and each node outputting a first link-up packet, and each first link-up packet including the priority value of each node; and
a plurality of links coupled to the ring ports respectively;
wherein, in the initial status, each node compares each first link-up packet, and fills the priority value of each node into the first link-up packet having a higher priority value to form a second link-up packet, and the priority value of each node and the highest priority value of each adjacent node recorded by each node are compared with each second link-up packet, and if the priority value of the node and the highest priority value of each adjacent node recorded by the node are smaller than the second link-up packet, the ring port enters into a forward status, and the links form a plurality of forward links and a blocked link respectively according to the forward status or the blocked status of each ring port.

2. The ring-based network of claim 1, wherein each node enters each ring port into the blocked status according to a ring port link-up message.

3. The ring-based network of claim 1, wherein each node further loads the priority value in the first link-up packet transmitted from each adjacent node into each ring port of the corresponding adjacent node.

4. The ring-based network of claim 1, wherein each node compares the first link-up packet transmitted from each adjacent node, and records the priority value of each adjacent node, and discards the first link-up packet having a lower priority value and no longer transmits the first link-up packet having the lower priority value to the other adjacent node.

5. The ring-based network of claim 4, wherein each node fills the priority value of each node into the first link-up packet having the higher priority value, and the priority value of each node is sequentially arranged after the priority value of each adjacent node.

6. The ring-based network of claim 1, wherein the ring port remains at the blocked status if the priority value of the node and the highest priority value of each adjacent node recorded by the node are equal to or greater than the second link-up packet.

7. The ring-based network of claim 1, wherein if the priority value of the node and the highest priority value of each adjacent node recorded by the node are equal to or greater than the second link-up packet, each node discards the second link-up packet having a lower priority value and no longer transmits the second link-up having the lower priority to the adjacent node.

8. The ring-based network of claim 7, wherein if the second link-up packet having the highest priority value is returned to each original output node, each original output node no longer transmits the second link-up packet having the highest priority value to the adjacent node, so that the ring-based network forms the forward links and the blocked link.

9. The ring-based network of claim 8, wherein the blocked link is a backup link of the ring-based network.

10. A construction method of a ring-based network, and the ring-based network comprising a plurality of nodes and a plurality of links, and each node having two ring ports and a priority value, and each link being coupled to each ring port, and the construction method comprising steps of:
- entering each ring port into a blocked status at an initial status;
- outputting a first link-up packet by each node through each ring port, and each first link-up packet including a priority value of each node;
- comparing each first link-up packet, and filling the priority value of each node into the first link-up packet having a higher priority value to form a second link-up packet;
- comparing the priority value of each node and the highest priority value of each adjacent node recorded by each node with each second link-up packet;
- entering the ring port into a forward status if the priority value of the node and the highest priority value of each adjacent node recorded by the node are smaller than the second link-up packet; and
- forming a plurality of forward links and a blocked link by each link according to the forward status or the blocked status of each ring port.

11. The construction method of a ring-based network as recited in claim 10, further comprising step of entering each ring port into the blocked status if each node detects to obtain a ring port link-up message.

12. The construction method of a ring-based network as recited in claim 10, further comprising step of loading the priority value in each first link-up packet into each ring port of the corresponding adjacent node by each node if each node receives the first link-up packet transmitted from each adjacent node.

13. The construction method of a ring-based network as recited in claim 10, further comprising steps of:
- comparing the first link-up packet transmitted from each adjacent node, and recording the priority value of each adjacent node; and
- discarding the first link-up packet having a lower priority value, and no longer transmitting the first link-up packet having the lower priority value to the other adjacent node.

14. The construction method of a ring-based network as recited in claim 10, further comprising step of filling the priority value of each node into the first link-up packet having a higher priority value, and the priority value of each node being arranged sequentially after the priority value of each adjacent node.

15. The construction method of a ring-based network as recited in claim 10, further comprising steps of:
- maintaining the blocked status of the ring port if the priority value of the node and the highest priority value of each adjacent node recorded by the node are equal to or greater than the second link-up packet; and
- discarding the second link-up packet having a lower priority value by the node, and no longer transmitting the second link-up packet having the lower priority value to the adjacent node.

16. The construction method of a ring-based network as recited in claim 15, further comprising steps of:
- no longer transmitting the second link-up packet having the highest priority value to the adjacent node by each original output node if the second link-up packet having the highest priority value is returned to each original output node; and
- forming the forward links and the blocked link of the ring-based network.

17. The construction method of a ring-based network as recited in claim 16, further comprising step of using the blocked link to form a backup link of the ring-based network.

* * * * *